United States Patent [19]

Tseng et al.

[11] Patent Number: 5,254,195
[45] Date of Patent: Oct. 19, 1993

[54] PROCESS FOR MANUFACTURING MOISTURE EXCHANGE ELEMENT

[75] Inventors: Pen C. Tseng; Yew K. Chuah; Chen U. Hwang; Shiao J. Chu; Han T. Chang; Chin S. Huang; Chang C. Chen; Po/Yu Chen, all of Hsinchu, Taiwan

[73] Assignee: Industrial Technology Research Institute, Hsinchu, Taiwan

[21] Appl. No.: 880,532

[22] Filed: May 8, 1992

[51] Int. Cl.$^5$ .............. B65H 18/00; B31F 7/00; B05D 5/00; B01J 20/00

[52] U.S. Cl. .............. 156/184; 156/191; 156/208; 427/344; 427/397.7; 427/397.8; 252/194; 252/315.6

[58] Field of Search .............. 427/344, 376.2, 397.7, 427/397.8; 55/388, 390; 65/22; 428/73, 116, 118; 502/405; 156/208, 182, 89, 184; 252/315.6, 194

[56] References Cited

U.S. PATENT DOCUMENTS

| | | | |
|---|---|---|---|
| 1,584,716 | 5/1926 | Behrman | 502/405 |
| 1,755,496 | 4/1926 | Behrman | 252/315.6 |
| 1,832,153 | 11/1931 | Stöwener | 502/405 |
| 1,868,565 | 7/1932 | Connolly | 502/405 |
| 1,872,183 | 8/1932 | Porter | 252/315.6 |
| 1,935,176 | 11/1933 | Connolly | 502/405 |
| 2,174,177 | 9/1939 | Kraybill | 502/405 |
| 2,243,296 | 5/1941 | Sweetland | 427/344 X |
| 2,505,079 | 4/1950 | Allen | 252/194 |
| 2,605,228 | 7/1952 | Alexander | 252/315.6 |
| 2,731,326 | 1/1956 | Alexander | 252/315.6 |
| 2,819,491 | 1/1958 | Gammill | 252/194 |
| 3,004,921 | 10/1961 | Stossel | 252/315.6 X |
| 3,252,917 | 5/1966 | Mindick | 252/315.6 |
| 3,297,399 | 1/1967 | Hobbs | 427/344 X |
| 3,313,739 | 4/1967 | Acker | 502/405 |
| 3,454,453 | 7/1969 | Ward | 427/344 |
| 3,650,977 | 3/1972 | Bobb | 252/315.6 |
| 3,883,435 | 5/1975 | Englebrecht | 502/405 |
| 3,956,171 | 5/1976 | Moore | 252/315.6 |
| 4,112,032 | 9/1978 | Blaszyk | 65/22 X |
| 4,650,621 | 3/1987 | Sago | 427/344 X |
| 4,738,874 | 4/1988 | Berardo | 427/344 |
| 4,886,769 | 12/1989 | Kuma | 502/70 X |
| 4,911,775 | 3/1990 | Kuma | 156/208 |
| 5,030,305 | 7/1991 | Fell | 156/208 X |
| 5,032,450 | 7/1991 | Rechlicz | 428/196 |
| 5,160,455 | 11/1992 | Clark | 252/315.6 |
| 5,185,037 | 2/1993 | Kaijou | 252/315.6 |

FOREIGN PATENT DOCUMENTS 55-142522 11/1980 Japan .
60-175521 9/1985 Japan .
63-175619 7/1988 Japan .

Primary Examiner—David A. Simmons
Assistant Examiner—Charles Rainwater
Attorney, Agent, or Firm—W. Wayne Liauh

[57] ABSTRACT

A process for preparing a moisture exchange element which comprises impregnating a substrate made of organic or inorganic fiber with an aqueous impregnating solution containing colloidal silica, an acid and a metallic cation; drying and gelatinizing the impregnating solution deposited on the impregnated substrate is disclosed. The absorbent formed on the substrate after the impregnating solution is dried has a pore size of about 60–70 Å, thus allowing the moisture exchange element of the present invention to provide improved moisture adsorbing/desorbing ability.

10 Claims, No Drawings

PROCESS FOR MANUFACTURING MOISTURE EXCHANGE ELEMENT

FIELD OF THE INVENTION

The present invention relates to a process of preparing a moisture exchange element, in particular to a process of preparing a honeycomb type moisture exchange element whose surface is deposited with solid adsorbent.

BACKGROUND OF THE INVENTION

The dehumidification of air or a humid gas mixture by using solid desiccants is well known in the art, which includes a static drying and a dynamic drying process. The static drying process comprises contacting the humid air with the moisture absorbing desiccants such as calcium sulfate, potassium hydroxide, calcium chloride so that moisture is removed therefrom. As a result the humid air is dehumidified. This static drying process can not satisfactorily undergo for a substantially long period due to the solid desiccants being not able to be regenerated in-situ after absorbing moisture. Therefore, it is not suitable for dehumidifying a large circulation of humid air. The dynamic drying process is a continuous process, in which adsorbing of moisture and regeneration of adsorbent are carried out simultaneously and independently. Typical adsorbents used in the dynamic process, for example, are silica gel, molecular sieves, and alumina. The dynamic drying process in general can be carried out in a two-tower fluidized bed dehumidifier or in a rotary honeycomb wheel dehumidifier. The two-tower fixed bed dehumidifier mainly contains two towers, each of which is filled with absorbent particles, and valves for shifting the humid air from the first tower to the second tower and at the same time shifting the regenerated hot air from the second tower to the first tower. This type of dehumidifier has several drawbacks such as a large pressure gradient in the fixed particle bed which leads to a significant power consumption, and an oscillating variation in humidity of the dehumidified air. The rotary honeycombed wheel dehumidifier contains a slow rotating wheel constructed by a cylindrical matrix having longitudinal passages and adsorbent deposited on the surface of the matrix. The humid air and the regenerated hot air are introduced separately and simultaneously to two different portions of the rotating wheel such that the adsorbent is periodically desorbed during the continuous dehumidification process. The rotary honeycombed wheel dehumidifier has the following advantages: a lower pressure gradient across the wheel, an increased absorbing surface area per unit volume, and a quick and effective absorbing-/desorbing ability. As a result, the power consumption is lowered, the dehumidification efficiency is enhanced, and the operation is easier when a rotary honeycombed wheel dehumidifier is used in comparison with a two-tower fixed bed dehumidifier.

A desired moisture exchange honeycombed wheel to be used in the above-described rotary dehumidifier should be small in heat capacity and light weighted, and should have excellent mechanical properties, and high moisture adsorbing capacity.

Japanese Invention Kokai 55(1980)-142522 discloses a process for manufacturing a moisture exchange element which comprises impregnating a porous sheet such as paper with moisture adsorbent solution such as an aqueous solution of calcium chloride, drying the impregnated sheet, adhering the dried sheet with a corrugated blank sheet to form a laminated sheet, cutting the laminated sheet into desired length, and laminating the cut sheets one above the other with adhesives to form a cubic moisture exchange element. In this process, the corrugated blank sheet is used to increase the mechanical strength of the element, and no adsorbent is deposited on its surface.

Japanese Invention Kokai 60(1985)-175521 discloses a process for manufacturing a dehumidifying element with a number of small through holes, in which an element with a number of small through holes is formed from paper made of organic fiber and inorganic fiber, the formed element is heated under a supply of insufficient volume of oxygen to carbonize the organic components contained in the element, and then is impregnated with a dehumidifying agent, wherein the formed element is impregnated with inorganic reinforcing agent before or after the carbonization.

Japanese Invention Kokai 63(1988)-175619 discloses a process for preparing a moisture absorbing strip, which comprises soaking a paper strip made from pulp and inorganic fiber, e.g. ceramic fiber, in water glass, semi-drying the soaked paper, passing the semi-dried paper through a pair of special rollers to form a corrugated strip, soaking the corrugated strip in an acid to produce silica hydrogel, and then washing with water to remove the salts formed as side products, and finally heating the resulting silica hydrogel deposited corrugated strip to remove the water contained therein by vaporization. A moisture-exchange honeycombed wheel can be formed on a roller by coiling up the corrugated strip along with a silica hydrogel deposited flat strip, wherein an adhesive is applied on the peaks of the corrugated strip immediately before the coiling for adhering the flat strip to the corrugated strip.

Several problems were confronted in carrying out the Japanese Kokai '619 process and we found that the problems are mainly caused by the water glass used. For example, the gelling rate of water glass is considerably too fast due to a high content of sodium ions. Consequently, the impregnating life of water glass bath is short, and the properties of the impregnated paper will vary after the water glass bath being used for a period of time. This fast gelling rate also affects the average pore size of the silica hydrogel adsorbent formed thereafter, which is about 20 Å. A moisture adsorbent having this level of average pore size does not have a satisfactory adsorbing capacity, which causes the adsorbent to be desorbed more frequently and is not suitable for dehumidifying a high-humidity air. Moreover, this fast gelling rate also makes the impregnated paper strip difficult to be semi-dried to an adequate degree to form a corrugated strip. In addition, the pH value of water glass is about 11.5, therefore, large quantities of acid are required in the acid catalyzed gelling reaction. Furthermore, the sodium salts formed as a side product in the acid catalyzed gelling reaction will deposite on the paper substrate, which not only increases the weight of moisture adsorbing strip, but blocks the pores of the adsorbent. These render the washing step inevitable. Yet, the sodium salts may still remain on the paper substrate after the washing. The residue of sodium salts will be gradually carried away in the adsorbing/desorbing operation and adversely affect the life of the dehumidifier. In addition, the silica hydrogel formed on the paper substrate may also be washed away with the sodium salts during the washing operation. More importantly, washing with water is time and labor consuming, and requires a large supply of water and complicated waste water treatments.

The objects of the present invention are to provide a process for preparing a moisture exchange element eliminating the drawbacks mentioned above; employing less number of steps than the prior art process and simplifying the execution; and increasing the amount of adsorbent deposited on the substrate and the adsorbing capacity of adsorbent deposited.

SUMMARY OF THE INVENTION

In order to achieve the objects of the present invention, a process for preparing a moisture exchange element comprising impregnating a substrate made of organic or inorganic fiber with an aqueous impregnating solution comprising colloidal silica, an acid and a metallic cation; and drying and gelatinizing the impregnating solution deposited on the impregnated substrate is disclosed. Preferably, the element has a honeycombed structure.

The impregnating solution comprises 5-20 wt % of colloidal silica, 0.25-2.5 wt % of a soluble metallic salt, and a sufficient amount of acid which maintains the solution pH value ranging from 5-9.

The drying and gelatinizing of the impregnating solution deposited on the impregnated substrate is accomplished by heating the impregnated substrate at a temperature of 100°-400° C. for a period of 40 minutes to 8 hours. In the present process, the colloidal silica aqueous impregnating solution has a significantly lower content of sodium ions than water glass such that no substantial sodium salt is formed in the silica gelling reaction, thereby avoiding a water washing procedure. The impregnating solution before the acid being added has a pH value of about 9.0, therefore a significantly lower amount of acid is required for neutralization than water glass. Moreover, the impregnating solution contains a suitable content of metallic cation such that the impregnating solution is able to maintain at a stable sol-gel state for a substantially long period of time under room temperature. However, at an elevated temperature of the drying and gelatinizing procedure, the metallic cation catalyzes the gelling reaction in the impregnating solution. Furthermore, the moisture exchange elements prepared by present process have a higher ratio of adsorbent to substrate than that of the water glass process, and the adsorbent deposited thereon has an average pore size of about 60-70 Å. Accordingly, the moisture exchange elements of the present invention have an improved moisture adsorbing/desorbing ability. In one of the preferred embodiments, it is found that a gram of the deposited adsorbent adsorbs 0.7-0.8 g water at a relative humidity of 80%.

DETAILED DESCRIPTION OF THE INVENTION

The fiber substrate used in the present process is a porous material having a density preferably less than 0.5 g/cm$^3$. Suitable examples are ceramic fiber, carbon fiber, glass fiber and polymer fiber, which can be woven or non-woven. The substrate can be a flat strip having a thickness of 0.10-0.60 mm, a corrugated strip made by this flat strip having a waveheight of 0.4-2.0 mm and a wavelength of 0.4-4.0 mm, or a honeycombed block or wheel formed by laminating this flat strip and this corrugated strip one by one.

The corrugated strip and the honeycombed block or wheel can be formed by any suitable processes known in the prior art, for the processes described in the Background of the Invention. Preferably, the corrugated strip is formed by passing the flat strip through a pair of special rollers or a combination of gear roller/toothplate, immediately followed by applying an aqueous colloidal silica binding solution on the wavy surface, and heating the coated strip at a temperature of 80°-120° C. for 40-90 minutes to dry and set the wavy shape. The lamination of the corrugated strip and the flat strip can be preformed by impregnating the flat strip with the binding solution, placing the impregnated flat strip on the corrugated strip, and heating the laminated strip at 80°-120° C. for 40-90 minutes. The colloidal silica concentration of the binding solution is 5-25 wt %, preferably 8-15 wt %. If the concentration is too high, the colloidal silica will occupy the pores within the flat or corrugated strip to an extent such that the adsorbent to substrate ratio of the moisture exchange element formed with these strips is decreased. If the concentration is too low, the corrugated strip and the honeycombed block or wheel will not have a sufficient mechanical strength. In one of the preferred embodiments, an integrated process for preparing a moisture exchange honeycombed wheel comprising forming a corrugated strip by using the impregnating solution as the binding solution; impregnating a flat strip with the impregnating solution; coiling up the corrugated strip along with the impregnated flat strip; and heating the coil at 250° C. for three hours is disclosed. Since only one colloidal silica solution is used in this integrated process, the moisture exchange element will have an uniform property throughout the whole structure, and a strong adhesion between the corrugated strip and the flat strip.

Any salts which are soluble in an aqueous solution and do not adversely affect the properties of the impregnated substrate can be used to provide the metallic cation in the impregnating solution. Preferably, the salts are inorganic acid salts such as halides, nitrates, hydroxides, sulfates, and the like. The metallic cation used may include the cations of Li, Ca, Al, Mg, Ni, Fe, Zn, Cu and the like. Among them Li and Ca are preferred.

The invention will be further illustrated by the following examples in which parts and percentages are by weight unless otherwise indicated. The average pore size was determined by BET nitrogen adsorption method using an apparatus named Micromeritic Digisorb 2600. The dehumidification tests were run at 20° C. and 79.5 relative humidity. The following definitions are used to describe the properties and moisture adsorption capacity of the moisture exchange element:

--- adsorbent deposition ratio (ADR), % =
[(wt. of moisture exchange element) − (wt. of fiber substrate)]/(wt. of fiber substrate) × 100%
moisture adsorption of element (MAE), % =
[(wt. of element after adsorption) − (wt. of element before adsorption)]/(wt. of element before adsorption) × 100%
moisture adsorption of adsorbent (MAA), % =
[(wt. of element after adsorption) − (wt. of element before adsorption)]/[(wt. of element) − (wt. of fiber substrate)] × 100%

EXAMPLE 1

Preparation of honeycombed Wheel 12.5 kg of a 40% colloidal silica (Ludox SM) aqueous solution was added to 37.5 kg water and stirred to prepare a binding solution (solution A). A 425.1 g ceramic paper strip having a width of 30 cm and a thickness of 0.5 mm (Kaowool Inc., Japan) was placed on a toothed plate and rolled over by a toothed roller. The solution A was then applied on the wavy surface thereof, followed by heating at 100° C. for one hour. The resulting corrugated strip was removed from the toothed plate, which was measured as 454.9 g, 0.6 mm wavelength and 0.4 mm waveheight. A ceramic paper same as above was impregnated with the binding solution A, immediately followed by coiling up this impregnated strip with the corrugated strip, and heating the coil at 100° C. for one hour. The resulting honeycombed wheel weighted 920.7 g and had a diameter of 40 cm.

EXAMPLE 2

Preparation of Impregnating Solution and Deposition of Adsorbent 1.0 kg LiCl was added to 1.0 l water and stirred for 15 minutes to form a solution. This solution was added to the solution A prepared according to the procedures of Example 1, and 0.1N sulfuric acid solution was then added until a pH value of 7.0 being obtained, and then stirred for additional 15 minutes. The honeycombed wheel prepared in Example 1 was immersed in this neutralized solution for one hour, and then was removed from the solution, left to dry under room temperature, and heated in an oven at 250° C. for three hours. The resulting moisture exchange wheel was weighed 1316.9 g, and its properties and moisture adsorption capacity are listed in Table 1.

EXAMPLE 3

The purpose of this example is to illustrate that a moisture exchange honeycombed wheel can be prepared by an integrated process using the impregnating solution to replace the binding solution in the preparation of a honeycombed substrate. As a result, this honeycombed substrate can be directly used as a moisture exchange element.

The procedures of Example 1 were repeated except that a 418.5 g ceramic paper and the impregnating solution of Example 2 were used to prepare a corrugated strip (447.8 g), and the impregnating solution was also used for binding a flat strip with the corrugated strip to form a honeycombed wheel (1146.3 g, 40 cm diameter). The properties and moisture adsorption capacity are shown in Table 1.

EXAMPLE 4

The procedures of Example 2 were repeated for the preparation of a moisture exchange wheel, except that the LiCl used was 0.5 kg. Its properties and moisture adsorption capacity are listed in Table 1.

EXAMPLE 5

The procedures of Example 2 were repeated for the preparation of a moisture exchange wheel, except that the LiCl used was 2.0 kg. Its properties and moisture capacity are listed in Table 1.

CONTROL EXAMPLE 1

The procedures of Example 2 were repeated for the preparation of a moisture exchange wheel, except that no LiCl was used. Its properties and moisture adsorption capacity are listed in Table 1.

CONTROL EXAMPLE 2

In 48 l water, 3 kg water glass was added and stirred thoroughly, and then an aqueous LiCl solution prepared by dissolving 1.0 kg LiCl in 1.0 l water was added thereto and stirred for 15 minutes. A 931.2 g honeycombed wheel prepared in accordance with the procedures of Example 1 was immersed in the water glass solution for one hour, 0.1N sulfuric acid solution was then added and stirred until the pH value reaches 7.0. The wheel was removed from the solution prior to the solution being gelatinized. The wheel was left to dry under room temperature and put into an oven for 3 hours at 250° C. The resulting dried wheel weighed 1286.3 g, and its properties and moisture adsorption capacity are listed in Table 1. The impregnating solution of the present example had a fast gelling rate and it was no longer usable after gelling.

CONTROL EXAMPLE 3

The procedures of Control Example 2 were repeated except that there was no LiCl in the impregnating solution. The properties and moisture adsorption capacity are listed in Table 1. The impregnating solution of this example was gelatinized within a period of 30 minutes and no longer usable thereafter.

EXAMPLE 6

The procedures of Example 2 were repeated except that the impregnating solution was stored under room temperature for five days before impregnating the substrate. The results are shown in Table 2.

EXAMPLE 7

The procedures of Example 5 were repeated except that the impregnating solution was stored under room temperature for three days before impregnating the substrate. The results are shown in Table 2.

CONTROL EXAMPLE 4

The procedures of Control Example 1 were repeated except that the impregnating solution was stored under room temperature for five days before impregnating the substrate. The results are shown in Table 2.

CONTROL EXAMPLE 5

The procedures of Control Example 2 were repeated except that the impregnating solution was stored under room temperature for three days before impregnating the substrate. The results are shown in Table 2.

CONTROL EXAMPLE 6

The procedures of Control Example 3 were repeated except that the impregnating solution was stored under room temperature for one hour before impregnating the substrate. The results are shown in Table 2.

TABLE 1

|  | ADR, % | MAE, % | MAA, % | average pore size, Å |
|---|---|---|---|---|
| Ex. 2 | 53.1 | 18.5 | 53.4 | 67 |
| Ex. 3 | 28.0 | 16.9 | 77.3 | 67 |

TABLE 1-continued

|  | ADR, % | MAE, % | MAA, % | average pore size, Å |
|---|---|---|---|---|
| Ex. 4 | 50.0 | 23.6 | 70.8 | 65 |
| Ex. 5 | 58.5 | 28.3 | 76.7 | 66 |
| Con. Ex. 1 | 49.8 | 6.0 | 17.9 | 49 |
| Con. Ex. 2 | 47.8 | 11.7 | 36.3 | 23 |
| Con. Ex. 3 | 50.0 | 13.4 | 42.0 | 20 |

TABLE 2

|  | ADR, % | MAE, % | MAA, % |
|---|---|---|---|
| Ex. 6[a] | 45.2 | 17.1 | 55.1 |
| Ex. 7[a] | 48.6 | 24.8 | 75.9 |
| Con. Ex. 4[a] | 39.8 | 6.3 | 22.3 |
| Con. Ex. 5[b] | — | — | — |
| Con. Ex. 6[b] | — | — | — |

[a] The impregnating solution was not gelatinized and still usable after storage.
[b] The impregnating solution was gelatinized and not usable after storage.

It can be clearly seen from the data of Tables 1 and 2 that the present process is superior to the control water glass process in view of the moisture adsorption capacity and the storage stability.

EXAMPLES 8-15

The procedures of Example 2 were repeated except that the impregnating solutions used had different compositions. The and results are shown in Table 3, in which the impregnating solution of Example 8 contained 25 kg of a 40% colloidal silica (Ludox SM) aqueous solution instead of 12.5 kg; LiOH, LiNO₃, CaCl₂, Al₂(SO₄)₃, and CuSO₄ were used respectively instead of LiCl in Examples 9-13, impregnating solutions having pH values of 6.0 and 8.3, respectively.

TABLE 3

|  | Examples | | | | | | | |
|---|---|---|---|---|---|---|---|---|
|  | 8 | 9 | 10 | 11 | 12 | 13 | 14 | 15 |
| MAE, % | 28.0 | 22.3 | 25.0 | 37.0 | 22.8 | 20.1 | 27.5 | 34.4 |

We claim:

1. A process for preparing a moisture exchange element comprising the steps of:
   (a) preparing a substrate made of organic or inorganic fiber;
   (b) impregnating the substrate with an aqueous impregnating solution comprising:
      (i) 5-20 wt % colloidal silica,
      (ii) 0.25-2.5 wt % metallic salt which is soluble in water, and
      (iii) an acid of an amount sufficient to maintain the pH value of the impregnating solution at 5-9; and
   (c) drying and gelatinizing the impregnating solution deposited on the impregnated substrate at an elevated temperature in such a manner that an absorbent having a pore size greater than 20 Å will be formed on the substrate.

2. The process according to claim 1, wherein the metallic salt is halide, nitrate, hydroxide or sulfate.

3. The process according to claim 2, wherein the metallic salt is Li, Ca, Al, Mg, Ni, Fe, Cu or Zn salt.

4. The process according to claim 1, wherein the acid is an inorganic acid.

5. The process according to claim 1, wherein the drying and gelatinizing step is carried out at a temperature of 100°-400° C. for 40 minutes to 8 hours.

6. The process according to claim 1, wherein the substrate is a honeycombed structure formed by laminating a corrugated strip having a waveheight of 0.4-2.0 mm and a wavelength of 0.4-4.0 mm and a flat strip having a thickness of 0.10-0.60 mm.

7. A process for preparing a moisture exchange honeycombed wheel comprising the steps of pressing a flat fiber strip to form a corrugated shape; applying an aqueous impregnating solution on the corrugated surface thereof; heating the coated strip to set the corrugated shape; impregnating another flat fiber strip with the impregnating solution, immediately followed by coiling up the impregnated flat strip along with the corrugated strip to form a honeycombed wheel; and heating the honeycombed wheel to dry and gelatinize the impregnating solution contained therein, wherein the impregnating solution comprises 5-20 wt % colloidal silica, 0.25-2.5 wt % metallic salt which is soluble in water, and an acid having an amount sufficient for maintaining the pH value thereof at 5-9.

8. The process for preparing a moisture exchange element according to claim 1 wherein the absorbent having a pore size between 60-70 Å.

9. The process for preparing a moisture exchange element according to claim 1 wherein the metallic salt is substantially free of sodium ions.

10. A process for preparing a moisture exchange element consisting essentially the steps of:
   (a) preparing a substrate made of organic or inorganic fiber;
   (b) impregnating the substrate with an aqueous impregnating solution comprising 5-20 wt % colloidal silica, 0.25-2.5 wt % metallic salt which is soluble in water, and an acid of an amount sufficient to maintain the pH value of the impregnating solution at 5-9; and
   (c) drying and gelatinizing the impregnating solution deposited on the impregnated substrate at an elevated temperature in such a manner that an absorbent having a pore size greater than 20 Å will be formed on the substrate.

* * * * *